(12) United States Patent
Neuhaus et al.

(10) Patent No.: US 8,894,291 B2
(45) Date of Patent: Nov. 25, 2014

(54) BEARING HOLDER

(71) Applicant: Johnson Electric S.A., Murten (CH)

(72) Inventors: Bruno Neuhaus, Wallenried (CH); Michael Watzek, Courgevaux (CH)

(73) Assignee: Johnson Electric S.A., Murten (CH)

( * ) Notice: Subject to any disclaimer, the term of this patent is extended or adjusted under 35 U.S.C. 154(b) by 46 days.

(21) Appl. No.: 13/730,566

(22) Filed: Dec. 28, 2012

(65) Prior Publication Data

US 2013/0169092 A1   Jul. 4, 2013

(30) Foreign Application Priority Data

Dec. 29, 2011   (CN) .......................... 2011 1 0453835

(51) Int. Cl.
   *F16C 43/00*   (2006.01)
   *H02K 5/16*    (2006.01)
   *F16C 35/06*   (2006.01)
   *H02K 5/173*   (2006.01)

(52) U.S. Cl.
   CPC ...... *H02K 5/16* (2013.01); *F16C 35/06* (2013.01); *H02K 5/1732* (2013.01)
   USPC ..................................................... 384/537

(58) Field of Classification Search
   CPC ........ H02K 5/16; H02K 5/1732; F16C 35/06; F16C 35/067; F16C 35/12
   USPC ......... 384/445, 456, 510, 537, 539, 559, 584, 384/585
   See application file for complete search history.

(56) References Cited

U.S. PATENT DOCUMENTS

| | | | | |
|---|---|---|---|---|
| 2,324,676 | A | * | 7/1943 | Butterfield ..................... 384/584 |
| 3,118,711 | A | * | 1/1964 | Bachelet et al. ............... 384/537 |
| 3,749,463 | A | * | 7/1973 | Krapf ............................. 384/539 |
| 4,335,498 | A | * | 6/1982 | Hague et al. .................... 74/820 |
| 4,443,044 | A | | 4/1984 | Cain et al. |
| 4,746,231 | A | * | 5/1988 | Hoshino ........................ 384/537 |
| 6,106,155 | A | | 8/2000 | Beyfuss et al. |
| 6,145,199 | A | * | 11/2000 | Malchow et al. ............. 384/535 |
| 6,318,900 | B1 | * | 11/2001 | Bere et al. ...................... 384/535 |
| 6,408,519 | B1 | | 6/2002 | Beyfuss et al. |
| 6,505,973 | B2 | | 1/2003 | Buchheim et al. |
| 6,666,583 | B2 | | 12/2003 | Nieman et al. |

* cited by examiner

*Primary Examiner* — James Pilkington
(74) *Attorney, Agent, or Firm* — Muncy, Geissler, Olds & Lowe, P.C.

(57) ABSTRACT

A bearing holder for fixing a bearing to a support structure such as a casing of a gearbox uses a single plate-like body. The body has a through hole, a plurality of hooks extending from a first side of the body and defining a first axial step limiting the axial movement of the bearing through the hole, and a plurality of projections extending from a second side of the body and arranged to be radially deformed to define a second axial step limiting the axial movement of the bearing through the hole in a second axial direction. Centering lips extending inwardly from the edge of the hole may be provided to fix the lateral position of the bearing.

16 Claims, 3 Drawing Sheets

BEARING HOLDER

CROSS REFERENCE TO RELATED APPLICATIONS

This non-provisional patent application claims priority under 35 U.S.C. §119(a) from Patent Application No. 201110453835.9 filed in The People's Republic of China on Dec. 29, 2012.

FIELD OF THE INVENTION

This invention relates to an arrangement for holding a bearing and in particular, to a bearing holder able to fix the axial position of the bearing.

BACKGROUND OF THE INVENTION

Conventionally, bearing fixations or bearing holders involve an assembly of multiple parts or a special fixation element. Each part of the construction increase the complexity and cost of the product and each construction step increases the duration of the assembly and thus the manufacturing cost.

One low cost method of fixing a bearing to a housing or structural component comprises forming hooks which build a housing for the bearing. This can be manufactured by stamping two plates which enclose the bearing from both sides. The hooks on one plate form one half of a complete housing that is made by both plates. When the bearing is placed in the housing portion of one plate, it is fixed in the lateral directions, but can still move axially and eventually become dislodged from the housing. To prevent axial movement, the housing is closed by assembling the two plates together. The use of two plates increases the cost of the bearing holder.

SUMMARY OF THE INVENTION

Hence there is a desire for a lower cost bearing holder.

This is achieved in the present invention by using a single plate or panel which is deformed after the bearing had been fitted to secure the bearing therein.

Accordingly, in one aspect thereof, the present invention provides a bearing holder for fixing a bearing, comprising: a plate-like body (panel) having a first side, a second side; a hole passing through the body, defining axial and radial directions and a void for receiving the bearing; a plurality of hooks extending from the first side of the body and defining a first axial step limiting the axial movement of the bearing through the void in a first axial direction, and a plurality of projections extending from the second side of the body and arranged to be radially deformed to define a second axial step limiting the axial movement of the bearing through the void in a second axial direction.

Preferably, a plurality of centering lips bear against a lateral side of the bearing for precise radial positioning of the bearing.

Preferably, the centering lips extend radially inwardly from the edge of the hole.

Preferably, the projections are U-shaped projections and the base of the U is arranged to bear against an axial end face of the bearing after being radially deformed.

Preferably, the base of each U-shaped projection is formed with a finger extending substantially radially inwardly, the fingers being arranged to accommodate the bearing before the projections are deformed and arranged to press against an axial end of the bearing to press the bearing against the first axial stop after the projections have been deformed.

Preferably, the hooks have a first portion extending in a substantially axial direction and a second portion extending in a substantially radially inward direction.

Preferably, the first portion of the hooks do not contact the bearing.

Preferably, the bearing is held within the void without any movement (clearance) between the first axial step and the second axial step.

Preferably, the body is a portion of a casing of a gearbox.

Preferably, the body is a portion of a bearing support plate.

According to a second aspect, the present invention also provides an actuator comprising: an output shaft, an electric motor, a gear train connecting the electric motor to the output shaft, a casing accommodating the gear train and supporting the motor and the output shaft, the output shaft being journalled in a bearing fixed to the gearbox casing by a bearing holder as defined above.

This low cost bearing holder may be used in a gearbox to simplify the assembly process of the gearbox while reducing the number of separate components and lowering costs.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
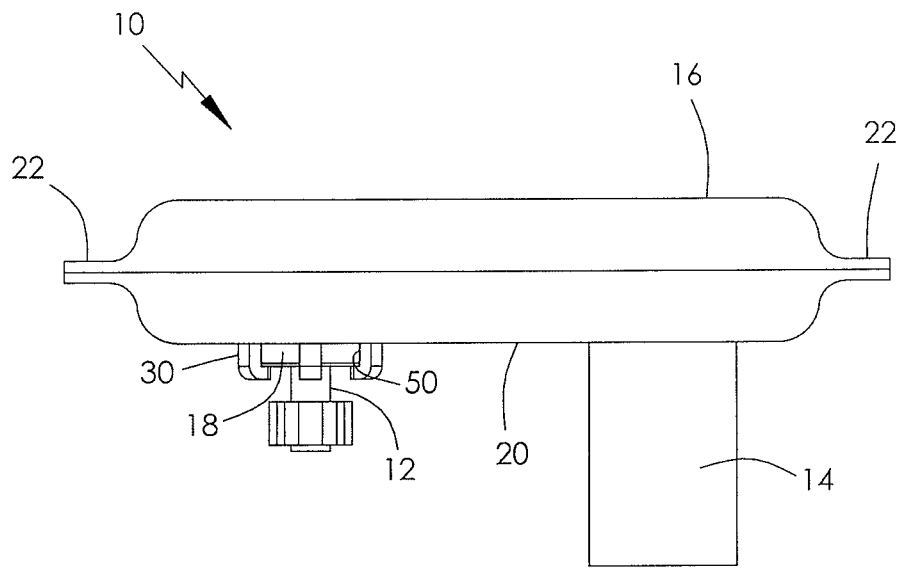
FIG. 1 is a view of an actuator incorporating a bearing holder according to the present invention.
Figure 2:
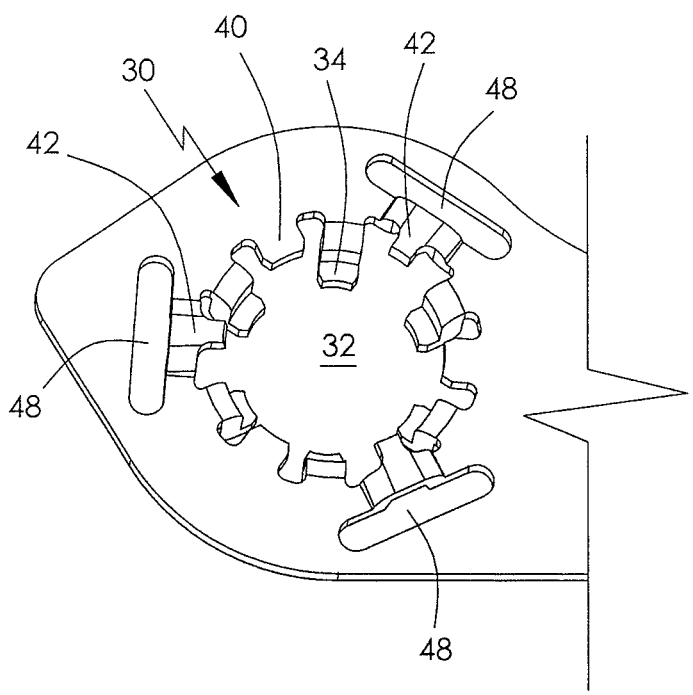
FIG. 2 is a view of the bearing holder of FIG. 1 prior to fitting of a bearing.
Figure 3:
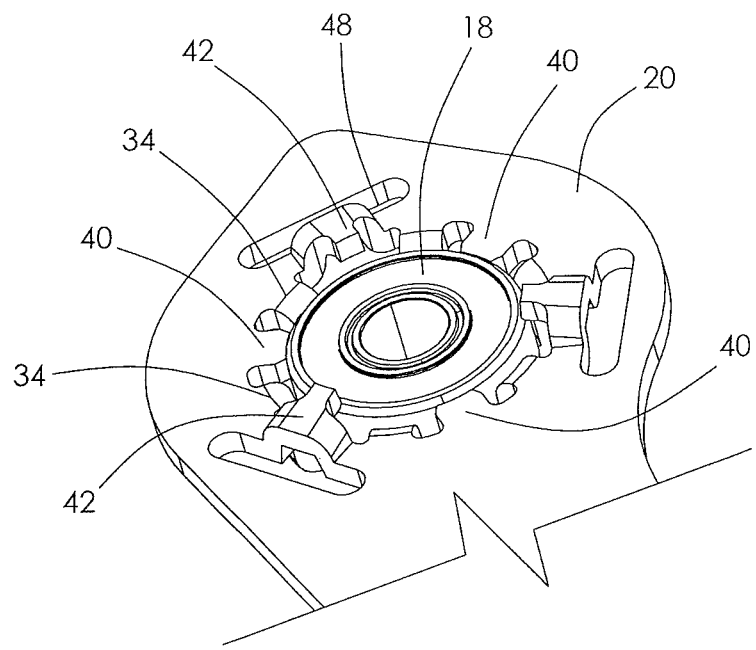
FIG. 3 is a view of the bearing holder of FIG. 2 after fitting of a bearing but prior to fixing of the bearing.
Figure 4:
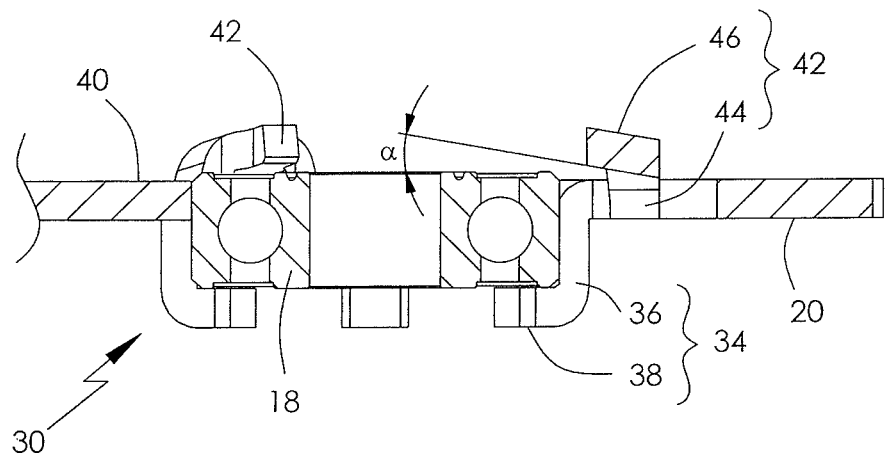
FIG. 4 is a sectional view of the assembly of FIG. 3.
Figure 5:
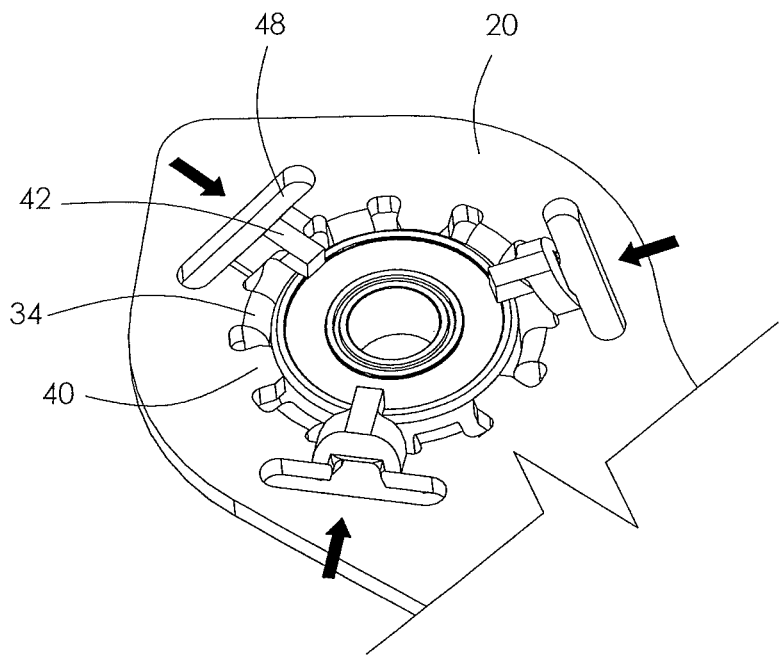
FIG. 5 is a plan view of the bearing assembly after the bearing as been fixed to the bearing holder.
Figure 6:
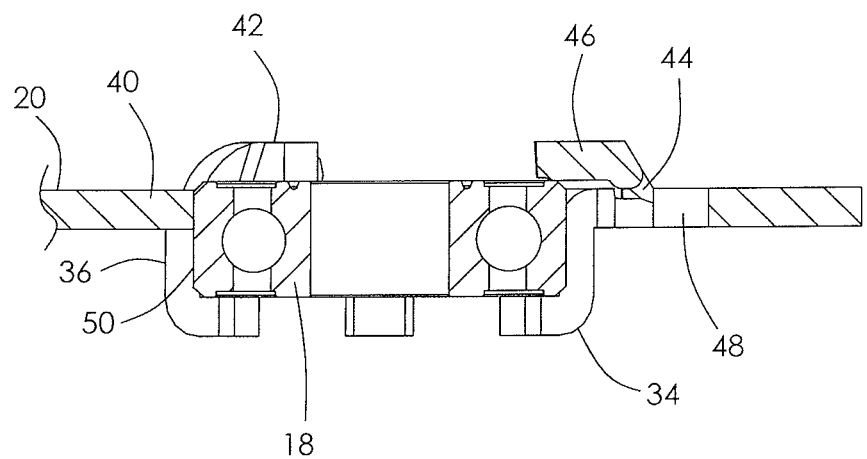
FIG. 6 is a sectional view of the assembly of FIG. 5.

FIG. 1 illustrates an actuator 10 having an output shaft 12 and an electric motor 14 which drives the output shaft through a gear train accommodated in a gearbox casing 16. The output shaft 12 is rotatably supported by a bearing 18 fixed to a plate-like body such as panel 20 of the casing 16 by a bearing holder 30 made in accordance with the preferred embodiment of the present invention. The position of the bearing must be precisely located without play or movement so that the location of the output shaft is fixed and definite. Typically, with such actuators, the item being driven by the actuator is aligned with the output shaft or the bearing during assembly and any movement of the bearing within the bearing holder will allow the position of the bearing to change, adversely affecting the operation of the actuator. As shown, the casing 16 has mounting lugs 22 for fixing the actuator to a mounting surface. The casing 16 is a two part casing having a base and a cover. The base is formed from a metal sheet and shaped or formed to suit the gear train and the mounting surface. The cover may be similarly formed. The panel 20 may be a portion of the base (as shown) or the cover.

The form of the bearing holder is shown in FIGS. 2 to 6. The bearing holder 30 is formed by punching and stamping the panel 20, preferably being a portion of the sheet metal casing 16. As such the bearing holder 30 is made from a single sheet or plate of metal material. A hole 32 is formed in the sheet for accommodating the bearing 18. The bearing illustrated is a typical ball bearing but other types of bearings may be used with the bearing holder, e.g. sleeve type bushings, roller bearings, etc.

A plurality of hooks 34 extend from adjacent the edge of the hole 32 to one side of the panel, say the bottom side as illustrated. The hooks may be termed bottom hooks and have an axially extending portion 36 and a radially extending portion 38 or tip which together form a stop or seat which the bearing 18 contacts. A plurality of radially inwardly directed projections extend from the edge of the hole to form centering lips 40 which contact a radially outer surface of the bearing 18 to laterally locate the bearing. Preferably the bearing and the centering lips are arranged such that the bearing is a tight fit within the centering lips.

A plurality of holding structures, referred to as butt straps 42, are formed on the side of the panel opposite to the bottom hooks, say the top side as shown. The butt straps are arranged to retain or fix the bearing within the bearing holder and ideally to press the bearing axially against the stop formed by the bottom hooks. While the butt straps may be simple radially deformable hooks, the preferred butt straps have a particular structure. Each butt strap 42 has a U-shaped part 44 with a radially directed finger 46 extending from the base of the U. An elongate aperture 48 is formed adjacent the edge of the hole 32 leaving a narrow strip between the hole and the aperture. This narrow strip is bent upwardly in the middle to form the U-shaped part 44. The finger 46 is initially formed with a slight upward inclination such that the finger makes an angle α with the panel or top of the bearing. The inner ends of the fingers are spaced sufficiently to allow the bearing to be inserted into the bearing holder 30.

Once the bearing 18 has been inserted into the bearing holder 30 with the bearing seated on or in contact with the bottom hooks 34, the butt straps 42 are radially deformed to move the fingers 46 radially inwardly such that the space between the inner ends of the fingers is too small for the bearing to pass through. In other words the fingers are moved radially inwardly so as to axially cover the upper end of the bearing preventing its removal from the bearing holder. Optionally the butt straps are simultaneously deformed using a fixture which applies a radial force to the butt straps as indicated by the block arrows in FIG. 5. In addition, the butt straps are arranged such that as the butt strap is radially deformed, the finger is rotated towards the horizontal reducing the value of a and makes contact with the upper end of the bearing to rigidly hold or press the bearing against the bottom hooks 34 and prevent axial movement of the bearing within the bearing holder. Ideally in the fully installed condition the finger 46 is parallel to and in full contact with the upper surface of the bearing 18, i.e. angle α is zero. However, those skilled in the art will realize that a certain tolerance in the thickness of the bearing and the stamping of the bearing holder panel can be easily tolerated by a variation in the angle α which may be, in the final assembled position in which the butt strap is pressing against the bearing with a desired force, more or less than 0 degrees.

The formation of the narrow strip to form the butt strap 42 means that the force required to radially deform the butt strap is controllable and the deformation results in a twisting of the narrow strip whereby spring back of the finger against the bearing when the deforming force is removed is not as detrimental to the holding force as a single axially directed deforming force. The slight inclination of the finger 46 before deformation of the butt strap helps ensure that the finger contacts the outer rim of the bearing and not the seal covers, when using a ball bearing or roller bearing, which may otherwise result in damage to the bearing.

To ensure precise radial positioning or radial fitting of the bearing 18, the radially outer surface of the bearing is only contacted by the centering lips 40. The bottom hooks 34 are arranged to only contact the bearing 18 by the radial portions 38 by leaving a gap 50 between the axially extending portions 36 and the radially outer surface of the bearing 18. This can be seen in FIG. 1. Similarly, the U-shaped parts 44 of the butt straps 42 do not contact the radially outer surface of the bearing, with just the fingers 46 bearing down, primarily in an axial direction on the upper face of the outer race of the bearing 18.

In use, the manufacture of the bearing holder is simple and the assembly of the bearing into the bearing holder is quick and easy. A plate or panel 20, such as a portion of the casing of a gear box, is stamped or deep drawn to create the through hole 32, bottom hooks 34, centering lips 40 and butt straps 42. The bearing 18 is inserted into the bearing holder. It is held radially, by the centering lips 40 and axially, in one direction, by radially extending portions 38 of the bottom hooks 34. The butt straps 42 are then simultaneously radially shifted inwards with an appropriate device to trap the bearing. Preferably the butt straps, after the radial shifting or plastic deformation, bear against the axial end of the bearing with a desired axial preload so that the bearing is nipped or sandwiched between the bottom hooks and the butt straps. Thus the bearing is held without any axial play.

In the preferred arrangement shown, there are three centering lips 40, three butt straps 42 and six bottom hooks 34 arranged equally spaced about the circumference of the hole 32, with a bottom hook being disposed between adjacent centering lips and butt straps.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, while the bearing holder has been described as being formed in the casing of the gearbox of an actuator, it may be formed in a simple bearing bracket, support plate or other suitable part where a bearing is required to be fixed. Also, while the centering lips are shown and described as extending inwardly from the edge of the hole, they could be provided on the axial portions of the bottom hooks.

The invention claimed is:
1. A bearing holder for fixing a bearing, comprising:
a planar body having a first side and a second side;
a hole passing through the body, defining axial and radial directions and a void for receiving the bearing;
a plurality of hooks extending from the first side of the body and defining a first axial step limiting the axial movement of the bearing through the void in a first axial direction, and a plurality of projections extending from the second side of the body and arranged to be radially deformed to define a second axial step limiting the axial movement of the bearing through the void in a second axial direction;

wherein the projections are U-shaped projections and the base of the U is arranged to bear against an axial end face of the bearing after being radially deformed; the base of each U-shaped projection is formed with a finger extending substantially radially inwardly, the fingers being arranged to accommodate the bearing before the projections are deformed and arranged to press against an axial end of the bearing to press the bearing against the first axial stop after the projections have been deformed.

2. The bearing holder of claim 1, further comprising a plurality of centering lips configured to bear against a lateral side of the bearing for precise radial positioning of the bearing.

3. The bearing holder of claim 2, wherein the centering lips extend radially inwardly from the edge of the hole.

4. The bearing holder of claim 1, wherein the bearing is held within the void without clearance between the first axial step and the second axial step.

5. The bearing holder of claim 1, wherein the body is a portion of a casing of a gearbox.

6. The bearing holder of claim 1, wherein the body is a portion of a bearing support plate.

7. An actuator comprising: an output shaft, an electric motor, a gear train connecting the electric motor to the output shaft, a casing accommodating the gear train and supporting the motor and the output shaft, the output shaft being journalled in a bearing fixed to the gearbox casing by the bearing holder of claim 1.

8. A bearing holder for fixing a bearing, comprising:
a planer body having a first side and a second side;
a hole passing through the body, defining axial and radial directions and a void for receiving the bearing;
a plurality of hooks extending from the first side of the body and defining a first axial step limiting the axial movement of the bearing through the void in a first axial direction, and
a plurality of projections extending from the second side of the body and arranged to be radially deformed to define a second axial step limiting the axial movement of the bearing through the void in a second axial direction;
wherein hooks have a first portion extending in a substantially axial direction and a second portion extending in a substantially radially inward direction; the first portion of the hooks do not contact the bearing.

9. The bearing holder of claim 8, further comprising a plurality of centering lips configured to bear against a lateral side of the bearing for precise radial positioning of the bearing.

10. The bearing holder of claim 9, wherein the centering lips extend radially inwardly from the edge of the hole.

11. The bearing holder of claim 8, wherein the bearing is held within the void without clearance between the first axial step and the second axial step.

12. The bearing holder of claim 8, wherein the body is a portion of a casing of a gearbox.

13. The bearing holder of claim 8, wherein the body is a portion of a bearing support plate.

14. A bearing holder for fixing a bearing, comprising:
a planar body having a first side and a second side;
a hole passing through the body, defining axial and radial directions and a void for receiving the bearing;
a plurality of hooks extending from the first side of the body and defining a first axial step limiting the axial movement of the bearing through the void in a first axial direction;
a plurality of projections extending from the second side of the body and arranged to be radially deformed to define a second axial step limiting the axial movement of the bearing through the void in a second axial direction; and
a plurality of centering lips extend radially inwardly from the edge of the hole and configured to bear against a lateral side of the bearing for precise radial positioning of the bearing.

15. The bearing holder of claim 14, wherein an axial length of each of the plurality of centering lips is less than that of the bearing.

16. An actuator comprising: an output shaft, an electric motor, a gear train connecting the electric motor to the output shaft, a casing accommodating the gear train and supporting the motor and the output shaft, the output shaft being journalled in a bearing fixed to the gearbox casing by the bearing holder of claim 14.

* * * * *